United States Patent Office 3,441,399
Patented Apr. 29, 1969

3,441,399
ABRASION RESISTANT GLASS SURFACES
Leon Levene and Ian M. Thomas, Toledo, Ohio, assignors to Owens-Illinois, Inc., a corporation of Ohio
No Drawing. Filed Aug. 16, 1965, Ser. No. 480,154
Int. Cl. C03c *17/06*
U.S. Cl. 65—60      7 Claims

ABSTRACT OF THE DISCLOSURE

Method for increasing the scratch resistance of a glass surface which includes treating the glass surface, while hot, with a chemically reduced material; and the article produced thereby.

---

The present invention relates to treatment of surfaces of glassware which are subject to abrasive contact with each other in the formal course of manufacturing, packaging and shipping. This invention further relates to improved abrasion-resistant glass articles of commerce such as jars, bottles, tumblers and the like produced by the aforesaid method.

Glass derives its strength from an unblemished surface and any scratches or flaws which are present on its surface decrease its strength down to as little as one-fourth of its original value. Generally, glass articles of commerce have their maximum strength as soon as they are formed and this strength decreases as the articles come into contact with each other and with other surfaces.

Attempts have been made to overcome the above mentioned deficiency of glass by treating the glass with the vapors of a metallo-organic compound at a temperature between the lowest annealing temperature of glass and the temperature at which deformation occurs. The temperature employed must be high enough to cause pyrolysis of the organic compound to form a metal oxide and, the immediate environmental area must also be essentially free from atmospheric moisture. Because it is difficult to maintain an anhydrous atmosphere within the heated chamber the process is wasteful since much of the material employed for the coating process is hydrolyzed to a useless form.

Accordingly, it is an object of the instant invention to provide a method for treating glass bodies by a process which eliminates the spraying of hydrolytically unstable metallo-organic compounds.

Another object of this invention is to provide a scratch resistant coating composition for glass surfaces.

It has now been surprisingly found that the shortcoming of the methods and compositions known and used in the past in attempting to form abrasion resisting coatings may be eliminated by spraying the glass surface with a reduced metal and then overcoating said reduced metal coating with an organic polymer. As used herein the term "reduced" contemplates the description of the valence status of a metallic radical in which the valence resides between the elemental value of zero and its maximum oxidized value.

In attaining the objects of this invention, one feature resides in treating a glass surface with a reduced organovanadate. Another feature resides in treating a glass surface with a reduced organic or inorganic titanate. Excellent scratch resistant coatings, which eliminate spraying hydrolytically unstable metal-organic compounds, have been prepared by spraying a dilute solution of a vanadate, which is reduced with tin, at the hot end or by spraying a dilute solution of a titanate, which is reduced with tin, at the hot end, and then overcoating said reduced vanadate coating or said reduced titanate coating with an organic coating at the cold end.

Still another feature of the instant invention resides in the use of a very low concentration of the reduced metal. The concentration of the prior art metals, as used in their higher oxidative states, may range from 20 to 100 percent. In the present case, concentrations as low as 1 to 3 percent may be successfully employed. The obvious resultant is a reduction in cost and the need for less metal.

The above and other objects, features and advantages of this invention will become apparent to those skilled in the art upon a reading of the following description of the invention.

In carrying out the invention, the glass surface of an article of manufacture, such as a bottle, jar, tumbler, sheet glass and the like, is first treated soon after the article leaves the glass-forming machine and as it is being conveyed to the annealing lehr. A solution of the reduced compound is sprayed onto the glass surface while the glass surface is still hot. The glass article now coated with a thin transparent layer of the reduced compound, enters the annealing lehr and is progressively cooled over a period of time and then sprayed with an organic coating. As examples of organic coatings may be cited polyethylene, polypropylene, polystyrene, polyurethane and the like.

The metal compounds which are applicable in this process are those metals which are capable of existing in multiple oxidative states, that is, organic compounds of metals that can have at least two valences. As examples of elements which are capable of gaining electrons and are thereby reduced may be cited titanium, vanadium, chromium, zirconium, iron, niobium and the like.

Among the titanium compounds suitable for the purpose of this invention are the alkyl titanates, preferably where each alkyl group contains from 1 to 8 carbon atoms. Among the alkyl titanates that may be used are tetrabutyl titanate, tetraisopropyl titanate, tetraethylhexyl titanate, tetramethyl titanate, tetraethyl titanate and the like. Also included among the suitable titanium containing compounds are titanium tetrahalides, such as titanium tetrachloride, titanium tetrabromide and titanium tetraiodide. Ammonium salts of titanium lactate are also suitable.

Vanadium compounds that may be used in this invention are, vanadates such as the alkyl vanadates containing 1 to 8 carbon atoms. As examples of vanadium compounds may be cited vanadyl trichloride, vanadium tetrachloride, vanadium penta-oxide, ammonium meta-vanadate, n-butyl vanadate, vanadium tetraiodide and the like.

As examples of reducing agents that may be used for the purpose of this invention are hydrazine, alkyl amines, tin, sulfur dioxide and the like.

The second coating composition which is employed in the present invention is the organic coating composition disclosed in U.S. Patent 2,995,533, which disclosure is incorporated herein by reference.

The now preferred emulsion is prepared by melting 40 parts of partially oxidized low molecular weight polyethylene having a molecular weight of approximately 1200–2000 and an acid number of 14 to 17, and adding thereto 11 parts of a fatty acid such as oleic, palmitic, stearic, lauric, or mixtures thereof. Two parts of an aqueous solution of an alkali metal hydroxide are then added to the mixture while the mixture is at a temperature of from 230–245° F. Water is also added in an amount of 207 parts. The polyethylene has a particle size of less than 10 microns, usually from 1 to 5 microns, and comprises a solid content of about 20 percent by weight of the emulsion. Additional details on how to make this emulsion are to be found in the specification of the aforesaid U.S. Patent 2,995,533. A preferred composition has the following proportions in approximate parts by weight:

| | Parts |
|---|---|
| AC polyethylene No. 629 | 40 |
| Oleic acid (U.S.P.) | 11 |
| Potassium hydroxide | 2 |
| Distilled water | 207 |

The aforesaid polyethylene is distributed by Allied Chemical and Dye Corporation. The above emulsion is then diluted with up to about 200 parts water by volume and sprayed directly onto the glass surface previously treated with the reduced coating composition.

The following examples are illustrative of preparing the compositions used in the present invention and should not be considered limiting in any way.

EXAMPLE I

To 10 milliliters of concentrated HCl is added 1 milliliter of tetraisopropyl titanate (Sp. Gr. 0.955). A vigorous reaction takes place producing a white solid which goes into solution easily yielding a yellow colored, clear solution. Tin dust, about 0.05 grams, is now added producing a vivid color change from yellow to lilac-purple, characteristic of $Ti^{+3}$ species. The clear solution thus formed is then poured into 100 milliliters of isopropyl alcohol. The final concentration of the reduced metal in solution is approximately 1 percent.

EXAMPLE II

To 10 milliliters of concentrated HCl is added 1 milliliter of tetraisopropyl titanate. A reaction takes place which produced a white solid which goes into solution easily yielding a yellow colored, clear solution. The clear solution formed is then poured into 100 milliliters of isopropyl alcohol. The final concentration of the unreduced solution is about 1 percent.

EXAMPLE III

To 10 milliliters of concentrated HCl is added about 1 milliliter of n-butylvanadate, producing a clear, very dark colored solution. To this acidic solution is added about 0.05 grams of tin, resulting in a vivid color change from black to green which is characteristic of reduced vanadium. This solution was then poured into 100 milliliters of isopropyl alcohol. The final concentration of the reduced solution is about 1 percent.

EXAMPLE IV

To 10 milliliters of concentrated hydrochloric acid is added about 1 milliliter of n-butylvanadate, producing a clear, very dark colored solution. This solution was then poured into 100 milliliters of isopropyl alcohol. The final concentration of the unreduced solution is about 1 percent.

The following examples are merely illustrative of the present invention and should not be considered limiting its scope in any way.

EXAMPLE V

Freshly formed clear beer bottles were taken as soon as formed and placed on a turn-table where they were sprayed with the reduced titanium solution. These hot bottles were then placed on a conveyor line and passed through the lehr for annealing. A clear, transparent coating formed on the surface of the bottles which was hard, but could, nevertheless be scratched by rubbing two bottles against each other.

EXAMPLE VI

The procedure of Example V was repeated in the present invention except that unreduced titanium was employed for the titanium used above. Rubbing of the two bottles against each other by hand resulted in scratches on both surfaces.

EXAMPLE VII

A number of bottles were treated by the process as described in Example V, except that reduced vanadium was used in place of the reduced titanium. The rubbing together of two bottles resulted in visible surface scratches.

EXAMPLE VIII

The process of Example VII was repeated in the present run, except that unreduced vanadium was used in place of the reduced vanadium. The results obtained were similar to the foregoing results.

EXAMPLE IX

A number of uncoated bottles were treated with the polyethylene potassium oleate solution described supra at a temperature of about 450° F. Scratch development was producable by intimately rubbing two bottles.

EXAMPLE X

A number of bottles treated with reduced titanium, reduced vanadium, unreduced titanium and unreduced vanadium were respectively coated with a solution of the polyethylene wax-potassium oleate composition. The results of these runs are presented below.

Bottles treated in accordance with the foregoing examples were tested with a scratch test machine, shown and described in U.S. Patent No. 3,323,889, to evaluate the effectiveness of the respective coatings. The machine is designed to abrade the surface of one glass bottle against the surface of a similar bottle. A bottle is fastened in a stationary low set of chucks while a second bottle is fastened in a set of upper chucks, which are positioned so that the axes of the bottles are at 90° relative to each other. A measured load, up to a maximum of 100 lbs., is applied to the upper bottle, and after each pass, the bottles are examined for scratches. A minimum figure of 50 lbs. is considered adequate. The force or load in pounds was measured with respect to the scratch resistance for dry bottles, bottles wetted with water and bottles which had been subjected to a caustic wash comprising a 5 percent NaOH solution at a temperature of 150° F. for a period of one-half hour. The results set forth below are for dry bottles, bottles which were wetted with water, and bottles subjected to the alkali treatment.

TABLE I.—NUMBER OF POUNDS TO PRODUCE SCRATCH

| | | | Alkali Soak | |
|---|---|---|---|---|
| Example | Dry | Wet | Dry | Wet |
| Uncoated bottles | 1-3 | | | |
| Reduced Ti | 2-5 | | | |
| Unreduced Ti | 15 | | | |
| Reduced Ti and organic coat | 100+ | 100+ | 100+ | 100+ |
| Unreduced Ti and organic coat | 10 | | | |
| Organic alone | 15-20 | | | |
| Tin and organic coat | 15 | | | |
| Tin alone | 10 | | | |

TABLE II.—NUMBER OF POUNDS TO PRODUCE SCRATCH

| | | | Alkali Soak | |
|---|---|---|---|---|
| Example | Dry | Wet | Dry | Wet |
| Uncoated bottles | 1-3 | 1-3 | | |
| Reduced V | 5-10 | 5-10 | | |
| Unreduced V | 3 | 5 | | |
| Reduced V and organic coat | 100+ | 100+ | 100+ | 100+ |
| Unreduced V and organic coat | 95 | 6 | | |
| Organic coat alone | 15-20 | 15-20 | | |
| Tin and organic coating | 15 | 10 | | |
| Tin alone | 10 | 10 | | |

The above tables clearly demonstrate the unexpected and synergistic results that are obtained by using reduced metals. The results clearly demonstrate that a reduced metal coating of titanium overcoated with an organic coating has as, dry tested, approximately ten times more scratch resistance than an unreduced titanium coating when tested under like conditions. Similarly, a reduced vanadium composition, when tested under wet conditions, has over fifteen times more scratch resistance abiilty than an unreduced vanadium composition.

While the illustrative embodiments of the invention have been described with particularity, it will be understood that various other modifications will be apparent and can readily be made by those skilled in the art without departing from the scope and spirit of the invention.

We claim:

1. A method for increasing the scratch resistance of a glass surface comprising treating a hot glass surface with the reaction product of a reducible alkyl vanadate compound and a reducing agent.

2. A method for treating a glass surface to increase its scratch resistance comprising treating a hot glass surface with a reduced vanadium compound.

3. A method for increasing the abrasion resistance of a glass surface which comprises treating a hot glass surface with a solution containing reduced vanadium.

4. A method for treating a glass surface to increase its scratch resistance which comprises treating a hot glass surface with a solution containing the reaction product of a reducible alkyl vanadate compound and a reducing agent, cooling said treated surface to a temperature below 450° F. and spraying said treated surface with an organic coating.

5. A method for increasing the abrasion resistance of a glass surface which comprises treating a freshly formed hot glass surface with a solution containing reduced vanadium, cooling said treated surface to a temperature below 450° F. and spraying said cooled surface with an aqueous emulsion of a low molecular weight polyethylene.

6. The method of claim 4 wherein said alkyl vanadate is n-butylvanadate.

7. As an article of manufacture, a glass container having the ability to resist scratches and abrasions said container being produced in accordance with the steps of claim 4.

References Cited

UNITED STATES PATENTS

| | | | |
|---|---|---|---|
| 3,323,889 | 6/1967 | Carl et al. | 65—60 |
| 3,352,707 | 11/1967 | Pickard | 117—72 |

DONALL H. SYLVESTER, *Primary Examiner.*

J. H. HARMAN, *Assistant Examiner.*

U.S. Cl. X.R.

65—30; 117—69, 72, 124